(12) United States Patent
Yin

(10) Patent No.: US 8,903,325 B2
(45) Date of Patent: Dec. 2, 2014

(54) USING OUT-BAND INFORMATION TO IMPROVE WIRELESS COMMUNICATIONS

(75) Inventor: Xuefeng Yin, Shanghai (CN)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/634,199

(22) PCT Filed: Feb. 21, 2011

(86) PCT No.: PCT/CN2011/071124
§ 371 (c)(1),
(2), (4) Date: Sep. 11, 2012

(87) PCT Pub. No.: WO2012/113132
PCT Pub. Date: Aug. 30, 2012

(65) Prior Publication Data
US 2013/0005285 A1    Jan. 3, 2013

(51) Int. Cl.
*H04W 72/02* (2009.01)
*H04B 17/00* (2006.01)
*H04N 1/00* (2006.01)

(52) U.S. Cl.
CPC .......... *H04B 17/009* (2013.01); *H04N 1/00336* (2013.01); *H04N 2201/0084* (2013.01)
USPC ..................................... 455/67.11; 455/115.1

(58) Field of Classification Search
CPC ........................................ H04W 72/00–72/02
USPC ............................................ 455/115.1, 67.11
See application file for complete search history.

(56) References Cited

U.S. PATENT DOCUMENTS

| 4,380,807 A | 4/1983 | Reynard |
| 5,949,833 A * | 9/1999 | Weerackody ................. 375/347 |
| 6,148,078 A | 11/2000 | Romesburg |
| 8,592,744 B2 * | 11/2013 | Van Dalen et al. ........... 250/226 |
| 2003/0189992 A1 * | 10/2003 | Nefedov ....................... 375/340 |
| 2004/0204026 A1 * | 10/2004 | Steer et al. ................. 455/550.1 |
| 2007/0217329 A1 * | 9/2007 | Abedi ........................... 370/208 |
| 2008/0143518 A1 * | 6/2008 | Aaron .......................... 340/540 |
| 2008/0146153 A1 * | 6/2008 | Grosspietsch et al. .......... 455/62 |
| 2010/0091920 A1 * | 4/2010 | Alexander et al. ............ 375/350 |

(Continued)

FOREIGN PATENT DOCUMENTS

| CN | 101044778 A | 9/2007 |
| CN | 101478352 A | 7/2009 |
| CN | 101668070 A | 3/2010 |
| CN | 101904149 A | 12/2010 |
| JP | 2001103002 | 4/2001 |
| JP | 2001358984 | 12/2001 |
| JP | 2006293535 | 10/2006 |
| KR | 2001-0033951 A | 4/2001 |

OTHER PUBLICATIONS

Azizyan, M., et al, SurroundSense: Mobile phone localization via ambience fingerprinting, MOBICOM, Sep. 20-25, 2009, pp. 261-272, ACM, New York, NY, USA.

(Continued)

*Primary Examiner* — Gennadiy Tsvey
(74) *Attorney, Agent, or Firm* — Brundidge & Stanger, P.C.

(57) ABSTRACT

Technologies and implementations for adapting communication settings in wireless devices are generally disclosed. In one aspect, a method may include receiving data from a sensor included in a wireless device, processing the data to generate an environment parameter related to an environment around the wireless device, determining a propagation channel characteristic based on the environment parameter, and, based at least in part on the propagation channel characteristic, adjusting a physical layer setting in the wireless device.

22 Claims, 6 Drawing Sheets

(56) References Cited

U.S. PATENT DOCUMENTS

| | | | | |
|---|---|---|---|---|
| 2011/0034129 | A1* | 2/2011 | Kim et al. | 455/41.3 |
| 2011/0084868 | A1* | 4/2011 | Daly et al. | 342/22 |
| 2011/0274348 | A1* | 11/2011 | Oicherman et al. | 382/165 |
| 2012/0050570 | A1* | 3/2012 | Jasinski et al. | 348/231.4 |
| 2012/0052872 | A1* | 3/2012 | Do | 455/456.1 |

OTHER PUBLICATIONS

Lu, H., et al, SoundSense: Scalable sound sensing for people-centric sensing applications on mobile phones, Mobisys, Jun. 22-25, 2009, pp. 165-178, ACM, New York, NY, USA.

Santhapuri, N., et al., Sensor assisted wireless communications, 2010 17th IEEE Workshop on Local and Metropolitan Area Networks (LANMAN), May 2010, pp. 1-5, New Jersey, USA.

Shankar, P., et al, CARS: Context-Aware Rate Selection for vehicular networks, Network Protocols, 2008, IEEE International Conference on Network Protocols (ICNP), Oct. 19-22, 2008, pp. 1-12, USA.

Campbell, A., et al, The rise of people-centric sensing, IEEE Internet Computing, Jul. 2008, pp. 12-21, vol. 12, Issue 4, New Jersey, USA.

The State Intellectual Property Office, The PR China, International Search Report and Written Opinion of the International searching authority for PCT/CN2011/071124 mailed on Sep. 22, 2011, China.

Wikipedia, Edge detection, last modified Aug. 31, 2012, accessed online on Sep. 11, 2012 via http://en.wikipedia.org/wiki/Edge_detection.

Wikipedia, Ray tracing (physics), last modified Aug. 28, 2012, accessed online on Sep. 11, 2012 via http://en.wikipedia.org/wiki/Ray_tracing_(physics).

* cited by examiner

500 A computer program product

502 A signal bearing medium 504 at least one of receiving data from a sensor included in a wireless device;

processing the received data to generate an environment parameter related to an environment around the wireless device;

determining a propagation channel characteristic based at least in part on the environment parameter; or responsive to the propagation channel characteristic, generating a physical layer setting for the wireless device, wherein the physical layer setting is based at least in part on the propagation channel characteristic.

| 506 a computer-readable medium | 508 a recordable medium | 510 a communications medium |

Fig. 5

USING OUT-BAND INFORMATION TO IMPROVE WIRELESS COMMUNICATIONS

BACKGROUND

Unless otherwise indicated herein, the approaches described in this section are not prior art to the claims in this application and are not admitted to be prior art by inclusion in this section.

In wireless communications, transmission techniques may be used to overcome communications problems such as, for example, fast fading due to multipath effects or interference among multiple users. To employ such transmission techniques, it may be useful to estimate characteristics of the wireless channel. Typically, in-band sensing techniques may be used to estimate the wireless channel characteristics. However, such in-band techniques may require a large computational overhead, additional devices to be added to the wireless device, and other difficulties.

SUMMARY

In accordance with some implementations, methods for using out-band information to adapt communication settings in a wireless device may include receiving data from a sensor included in the wireless device, processing the data to generate an environment parameter related to an environment around the wireless device, determining a propagation channel characteristic based on the environment parameter, and, based on the propagation channel characteristic, adjusting a physical layer setting in the wireless device.

In accordance with some implementations, methods for using out-band information to adapt communication settings in a wireless device may include receiving image data from a camera included in the wireless device, receiving sound data from a microphone included in the wireless device, processing the image and sound data to generate an environment parameter related an environment around the wireless device, determining a propagation channel characteristic based on the environment parameter, and, based on the propagation channel characteristic, adjusting a physical layer setting in the wireless device.

In accordance with some implementations, a machine readable medium may include instructions that, when executed, may cause the machine to provide communication settings for a wireless device based on out-band information by receiving data from a sensor included in the wireless device, processing the data to generate an environment parameter related to an environment around the wireless device, determining a propagation channel characteristic based on the environment parameter, and, based on the propagation channel characteristic, generating a physical layer setting for the wireless device.

In accordance with some implementations, an apparatus may include a processor and a machine readable medium having stored therein instructions that, when executed, cause the apparatus to provide communication settings for a wireless device based on out-band information by receiving data from a sensor included in the wireless device, processing the data to generate an environment parameter related to an environment around the wireless device, determining a propagation channel characteristic based on the environment parameter, and, based on the propagation channel characteristic, generating a physical layer setting for the wireless device.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 is an illustration of an example computer program product; and

DETAILED DESCRIPTION

Figure 1:
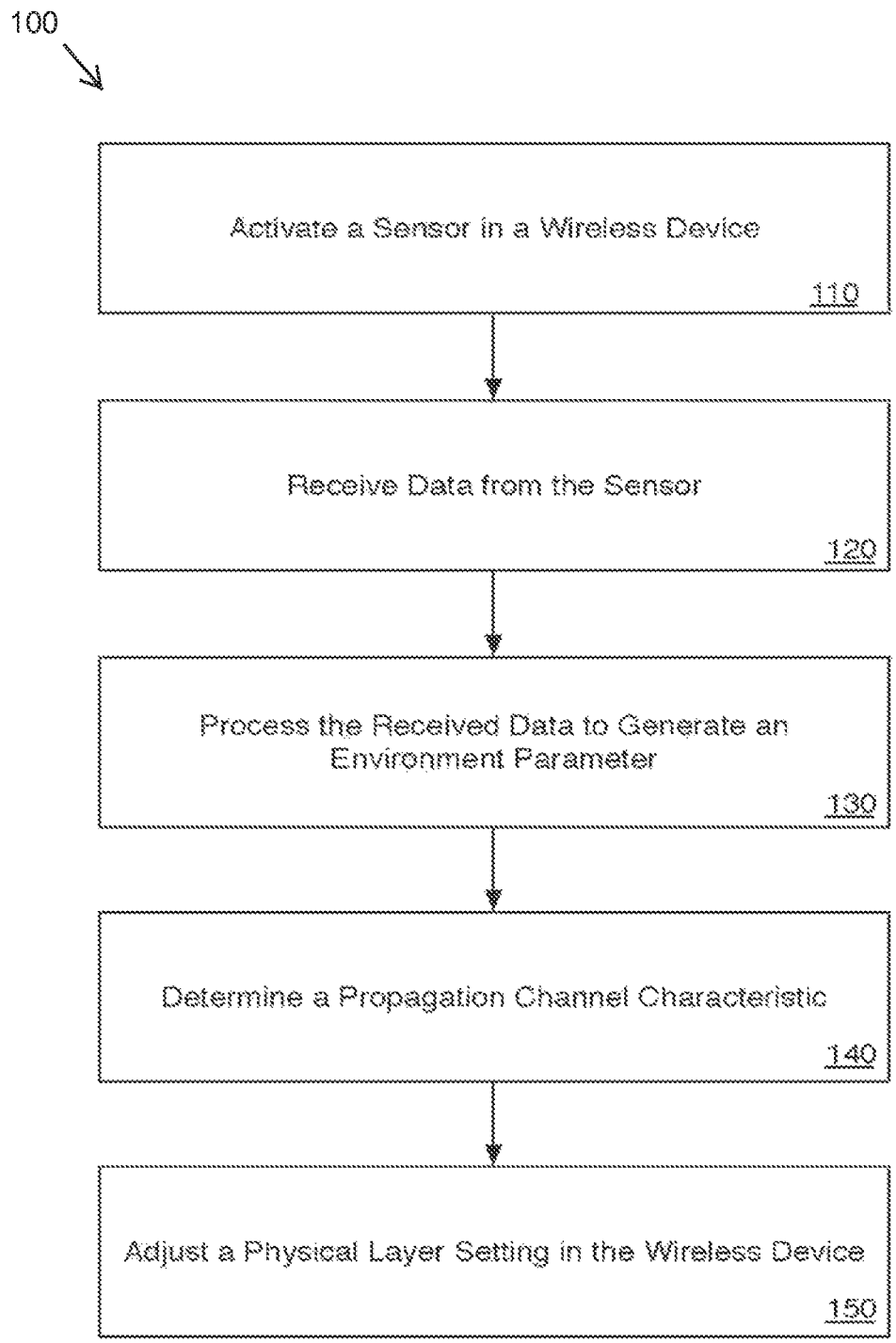
FIG. 1 is an illustration of a flow chart of an example method for adapting communication settings in a wireless device.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, systems and computer readable media related to using out-band information to adapt communication settings in wireless devices.

Various transmission techniques may be used to overcome wireless communications problems. To advantageously implement such techniques, it may be useful to estimate characteristics of a wireless communications channel being used by a wireless device. Based on channel characteristics, a physical layer setting or settings may be adjusted in the wireless device to improve communications.

In some examples, out-band information may be used to adapt settings in a wireless device. In some examples, data may be obtained at a sensor included in the wireless device. In various examples, the sensor may be a camera or a microphone and the obtained data may be image data or sound data, respectively. The obtained data may be received, for example, at a processing portion of the wireless device or at a remote computing device. The received data may be processed using a variety of techniques discussed further herein to generate an environment parameter or indicator that may characterize and be related to an environment around the wireless device. Based at least in part on the environment parameter or indicator, a propagation channel characteristic for the wireless device may be determined. Responsive to the determined propagation channel characteristic, a physical layer setting for the wireless device may be determined and the setting may be asserted or implemented at the wireless device. A discussed, in some examples, the environment parameter or indicator, the channel characteristic and the physical layer setting may be determined at the wireless device. In other examples, any of those may be determined at a remote computing device and transmitted to the wireless device.

FIG. 1 is an illustration of a flow chart of an example method 100 for adapting communication settings in a wireless device. Method 100 may include one or more functions, operations or actions as illustrated by one or more of blocks 110, 120, 130, 140 and/or 150. In some examples, method 100 may be implemented at a wireless device such as, for example, a cellular phone. The process of method 100 may begin at block 110.

At block 110, "Activate a Sensor in a Wireless Device", a sensor provided in a wireless device may be activated. In some examples, the sensor may obtain or detect out-band information for use in adapting communication settings in the wireless device. In some examples, the sensor may be a device embedded in the wireless device. In some examples, the sensor may be a camera. In some examples, the sensor may be a camera installed on the back of the wireless device such that as the user makes a call and holds the device, the camera may face and be exposed to the environment around the wireless device. In some examples, the sensor may be a microphone. In some examples, the activation may occur based on a criteria such as, for example, a wireless communication event (i.e., a phone call, receiving or sending a message, web browsing) or at regular time intervals. In some examples, the activation of the sensor may not be related to an immediate output for the user. For example, no visual output may be provided to the user upon activation of the camera. The process may continue at block 120.

At block 120, "Receive Data from the Sensor", data from the sensor may be received. In some examples, data may be received at a processing portion of the wireless device. Such a processing portion may include logic or a microprocessor and/or memory. In some examples, data obtained at a sensor in a wireless device may be sent from the wireless device and received at a remote device such as, for example, a server or a computer, for processing. The received data may be in any format recognizable by a processing portion of a device such as, for example, a data file, a data packet, or the like. In some examples, the device may be a camera and the data may include image data or a series of image data. In some examples, the device may be a microphone and the data may include audio data. The process may continue at block 130.

At block 130, "Process the Received Data to Generate an Environment Parameter", the received data may be processed to generate an environment parameter or parameters related to the environment around the wireless device. In some examples, image data from a camera may be processed to provide an environment parameter. In some examples, audio data from a microphone may be processed to provide an environment parameter. In some examples, both image data from a camera and audio data from a microphone may be used to provide an environment parameter. As discussed, in some examples, the processing may be performed at the wireless device. In other examples, the processing may be performed at a remote device.

A range of processing methods, environment parameters and environments may be available. In general, the environment parameter may include any parameter, parameters, indications or characterizations that may be related to an environment around the wireless device. In some examples, the environment parameter may include a numerical indication or rating of the density or types of objects in the environment. In some examples, the environment parameter may include a categorization of the type of environment around the wireless device. In various examples, the environment parameter may include an indication such as, for example, one of the following: an indoor indication, an outdoor indication, an urban indication, a suburban indication, a rural indication, a corridor indication, a cafeteria indication, a confined room indication, a stationary indication, a vehicular motion indication, a nomadic indication, a plant-rich indication, an open area indication, or a closed area indication. Other categories and indications may be available.

In some examples, fewer categories may be used, such as, for example outdoor, urban and indoor. In some examples, categories and subcategories may be used. For example, an environment parameter may include an indoor indication and one of a corridor, a cafeteria, a hall, or an enclosed room indication as a more detailed description of the indoor indication. A variety of combinations of categories and indications may be used to characterize the environment around the wireless device. The environment indications may be related to a best approximation of the category of the environment around the wireless device. The environment parameter may be encoded in any suitable manner, such as, for example, encoding into a data file, a packet, a message or the like. As discussed further below, in other examples, the environment parameter may include detailed information regarding the environment around the wireless device. The process may continue at block 140.

At block 140, "Determine a Propagation Channel Characteristic", a propagation channel characteristic may be determined based at least in part on the environment parameter. In some examples, the determined propagation channel characteristic may include the channel coefficients of the propagation channel. In some examples, the determined propagation channel characteristic may include the channel status information of the propagation channel. In some examples, the determined propagation channel characteristic may include, for example, a time-variability of the propagation channel, a fading characteristics of the propagation channel, a power delay profile of the propagation channel, a Doppler frequency spectrum of the propagation channel, a temporal auto-correlation of the propagation channel, a spatial auto-correlation of the propagation channel, a frequency auto-correlation of the propagation channel, a coherent distance of the propagation channel, a coherent time of the propagation channel, a coherent frequency of the propagation channel, a rank information of the propagation channel, a shadowing of the propagation channel, a multi-path propagation phenomenon of the propagation channel, a reflection of the propagation channel, a refraction of the propagation channel, a diffraction of the propagation channel, a diffuse scattering of the propagation channel, a selectivity of the propagation channel in angles (e.g., azimuth and elevation), a polarization status of the propagation channel, a frame length, a symbol length, a multipath severity of the propagation channel, or the like.

In some examples, the determined propagation channel characteristics may be based on the environment parameter. In some examples, the determined propagation channel characteristics may be determined based on a look-up table such that the environment parameters may be used to find corresponding characteristics in the look up table. In some examples, the characteristics may be determined using an algorithm or algorithms. In some examples, the environment parameters or objects may be used to determine the channel characteristics using ray tracing techniques. In some examples, the environment parameters or objects may be used to simulate the general profile of the channel using simulation techniques. In some examples, the environment parameters or objects may be used to determine the channel characteristics using ray launching techniques. As discussed, in some examples, the processing may be performed at the wireless device while in other examples, the processing may be performed at a remote device. The propagation channel characteristic may be encoded in any suitable manner, such as, for example, encoding into a data file, a packet, a message or the like. In some examples, As is discussed in further detail below, a variety of propagation channel characteristics may be determined. The process may continue at block 150.

At block 150, "Adjust a Physical Layer Setting in the Wireless Device", a physical layer setting in the wireless device may be adjusted. The physical layer setting may include a variety of settings or parameters. In some examples, the physical layer setting may include, for example, a diversity scheme selection parameter, a signal-to-noise ratio prediction parameter, an adaptive modulation parameter, a data rate adaption parameter, a Doppler frequency setting, a polarization setting, a direction of departure adaption parameter, a direction of arrival adaption parameter, a coherent frequency adaption parameter, a coherent distance adaption parameter, a coherent time adaption parameter, or a channel status information feedback scheme parameter. A variety of physical layer settings may be available. In some examples, the environment parameter, the propagation channel and the physical layer setting may be determined and implemented at the wireless device. In other examples, one or more of the environment parameter, the propagation channel or the physical layer setting may be determined at a remote device and transmitted to the wireless device, such that a physical layer setting may be ultimately applied or adjusted at the wireless device.

As discussed, a sensor in a wireless device may be employed to obtain data for use in adjusting a physical layer setting in the wireless device. In some examples, the sensor may be a camera and the obtained data may be image data that may represent an image or a series of image data that may represent a series of images. In some examples, image data may be processed by, for example, detecting an edge, determining an edge orientation and a length of the edge, detecting a surface, determining areas of uniform color, determining sharp changes in color, detecting a human face, detecting a human body, detecting a traffic lane, detecting an object, recognizing a shape, modeling an object, or the like. In some examples, the object detection may include computer aided design (CAD) type object modeling. The image data processing may be used to determine an environment parameter or parameters as discussed above with respect to FIG. 1.

Figure 2A:
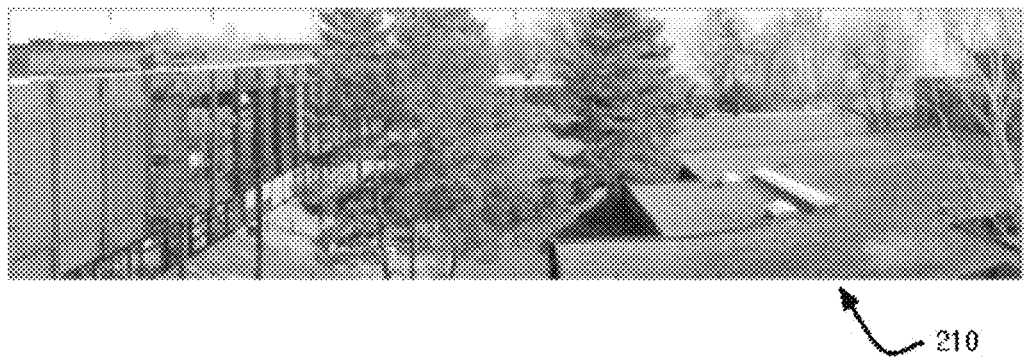
FIGS. 2A and 2B are illustrations of an example environment and example object recognition and expected propagation paths in the environment.
Figure 2B:
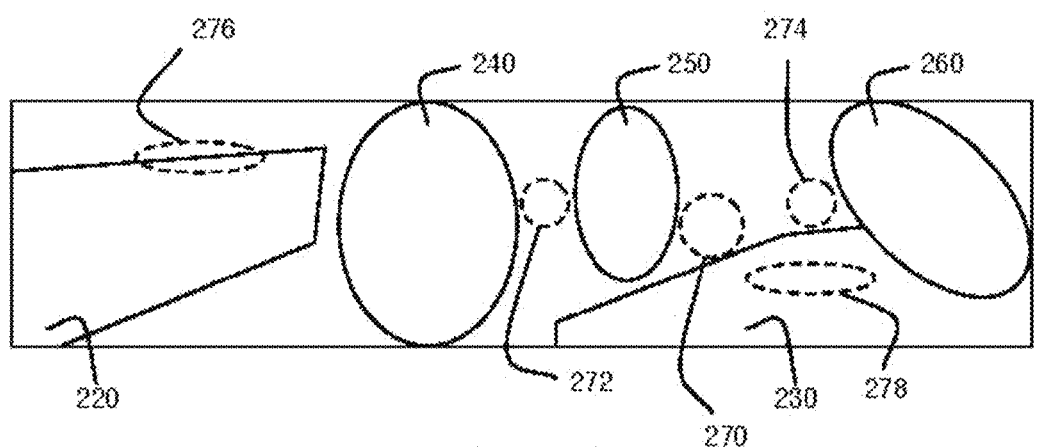

FIGS. 2A and 2B are illustrations of an example environment and example object recognition in the environment. FIG. 2A illustrates an example environment 210. As discussed above, a camera in a wireless device may obtain image data representative of environment 210 during an activation event at the wireless device. The image of FIG. 2A is meant to be illustrative, in the discussed examples, the obtained image data may not be displayed in visual form to a user. The image data may be processed to evaluate or identify objects in environment 210. For example, the image data may be processed using edge detection techniques, edge orientation determination techniques, surface detection techniques, color evaluation techniques, color contrast detection techniques, object detection, modeling techniques or any of the techniques discussed herein.

FIG. 2B is an illustration of example of object recognition and expected propagation paths based on environment 210. As shown in FIG. 2B, building surfaces 220, 230 and trees 240, 250, 260 may be recognized based on processing the image data related to environment 210. The image illustrated in FIG. 2B may be represented as a data set or a data file, for example. The objects and information based on the processing may be used to determine an environment parameter related to environment 210, as discussed above with respect to FIG. 1. In some examples, environment 210 may be determined to be an outdoor environment and the environment parameter may include an outdoor indication. In some examples, the environment parameter may include an indication of the amount or density of foliage. In some examples, the environment parameter may include a detailed mapping of object locations in the outdoor environment including tree locations and/or building locations, or the like.

As discussed, the processed data may be used to determine propagation channel characteristics. In the example of FIGS. 2A and 2B, the processed image data may be used to determine propagation channel characteristics. In some examples, the recognized objects, and their related details (i.e., sizes, orientations, locations, roughness, and the like) may be used to determine propagation channel characteristics. In various examples, the propagation channel characteristics may include, for example, a fading characteristic of the propagation channel, a Doppler frequency spectrum of the propagation channel, a temporal auto-correlation of the propagation channel, a spatial auto-correlation of the propagation channel, a frequency autocorrelation of the propagation channel, a shadowing of the propagation channel, a multi-path propagation phenomenon of the propagation channel, a reflection of the propagation channel, a refraction of the propagation channel, a diffraction of the propagation channel, a diffuse scattering of the propagation channel, a frame length, a symbol length, a multipath severity of the propagation channel, or the like.

In some examples, the propagation channel characteristics may include a channel profile. For example, in the illustration of FIG. 2B, typical channel path distributions may be expected at, for example, a location 270 between tree 250 and building surface 230, a location 272 between tree 240 and tree 250, a location 274 just to the left of tree 260 and above building surface 230, at a location 276 along building surface 230, and a location 278 along building surface 230. Typically, propagation paths may not be expected in some locations such as, for example, through tree 240 or tree 250. Thereby, predicted propagation arrival paths, both in the azimuth and the elevation, may be determined. In some examples, the detected edges, corners, surfaces of buildings, or detected objects may provide an approximation of a composition of the channel. In some examples, edges may be a source of electromagnetic wave radiation. In some examples, surfaces may influence the channel by adding spread in delay, angles and polarization. In some examples, objects in the environment may cause signal attenuation and fading in the signal power of a propagation channel. Such details may be determined from the environment parameter or parameters to characterize the propagation channel.

As discussed with respect to FIG. 1, the propagation channel characteristic may be used to determine and adjust a physical layer setting in the wireless device. In an example method related to the example environment illustrated in FIG. 2, the method may include a user operating a mobile device to make a phone call. Upon initiation of the call, a camera embedded in the mobile device may be activated. The activated camera may obtain image data representative of environment 210. The image data may be received from the sensor, and the received data may be processed to generate an environment parameter or parameters indicating, for example, that environment 210 may be an outdoor environment. A propagation channel characteristic or characteristics such as, for example, any of those listed herein, may be determined based on the environment parameter or parameters. The propagation channel characteristic or characteristics may be used to adjust a physical layer setting in the wireless device. Thereby, advantageous transmission techniques may be used in the wireless device based on the environment around the device.

Figure 3A:
FIGS. 3A and 3B are illustrations of an example environment and example object recognition and expected propagation paths in the environment.
Figure 3B:
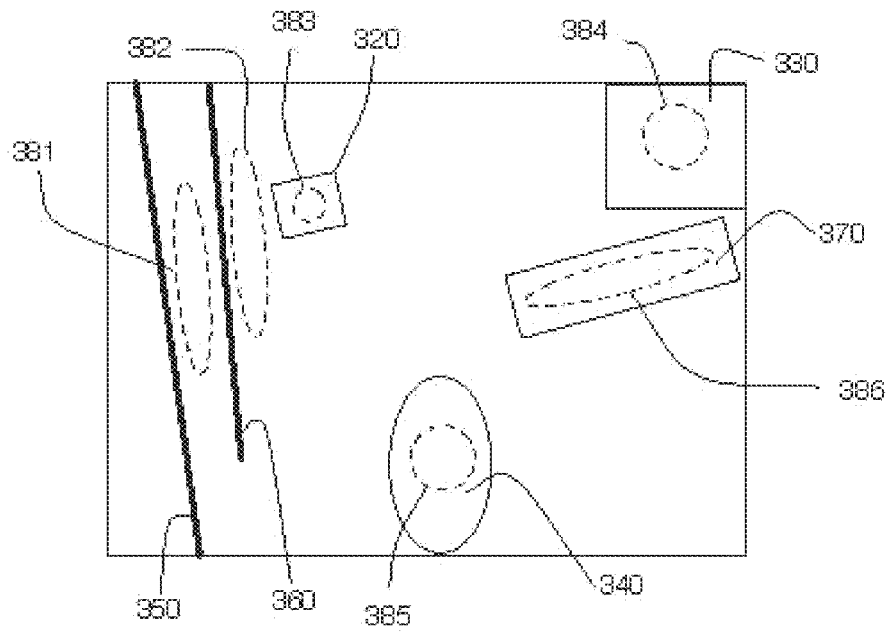

FIGS. 3A and 3B are illustrations of an example environment and example object recognition in the environment. FIG. 3A illustrates an example environment 310. As discussed above, a camera in a wireless device may obtain image data representative of environment 310 during an activation event at the wireless device. The image of FIG. 3A is meant to be illustrative, in the discussed examples, the obtained image data may not be displayed in visual form to a user. The image data may be processed to evaluate or identify objects in environment 310. For example, the image data may be processed using edge detection techniques, edge orientation determination techniques, surface detection techniques, surface roughness detection techniques, color evaluation techniques, color contrast detection techniques, object detection, modeling techniques or any of the techniques discussed herein.

FIG. 3B is an illustration of example of object recognition and expected propagation paths based on environment 310. As shown in FIG. 3B, surfaces 320, 330, 340, clutter 370 and edges 350, 360 may be recognized based on processing the image data related to environment 310. The image illustrated in FIG. 3B may be represented as a data set or a data file, for example. The objects and information based on the processing may be used to determine an environment parameter related to environment 310, as discussed above with respect to FIG. 1. In some examples, environment 310 may be determined to be an indoor environment and the environment parameter may include an indoor indication. In some examples, the environment parameter may include an indication of the amount or density of objects in the indoor environment. In some examples, a detailed mapping of the indoor environment including object types and locations, or the like.

As discussed, the processed data may be used to determine propagation channel characteristics. In the example of FIGS. 3A and 3B, the processed image data may be used to determine propagation channel characteristics. In some examples, the recognized objects, and their related details (i.e., sizes, orientations, locations, and the like) may be used to determine propagation channel characteristics. In various examples, the propagation channel characteristics may include, for example, a Doppler frequency spectrum of the propagation channel, a temporal auto-correlation of the propagation channel, a shadowing of the propagation channel, a multi-path propagation phenomenon of the propagation channel, a reflection of the propagation channel, a refraction of the propagation channel, a diffraction of the propagation channel, a diffuse scattering of the propagation channel, a frame length, a symbol length, a multipath severity of the propagation channel, or the like.

In some examples, the propagation channel characteristics may include a channel profile. For example, in the illustration of FIG. 3B, channel path distributions may be expected at, for example, a location 381 between edges 350, 360, a location 382 between edge 360 and surface 320, a location 383 at surface 320, a location 384 at surface 330, a location 385 at surface 340, and a location 386 at clutter 370. Thereby, predicted propagation arrival paths, both in the azimuth and the elevation, may be determined. As discussed, the detected edges, corners, surfaces of buildings, or detected objects may be used to provide an approximation of a composition of the channel. In some examples, edges may be a source of electromagnetic wave radiation. In some examples, surfaces may influence the channel by adding spread in delay, angles and polarization. In some examples, objects in the environment may cause signal attenuation and fading in the signal power of a propagation channel. Such details may be determined from the environment parameter or parameters to characterize the propagation channel.

As discussed with respect to FIG. 1, the propagation channel characteristic may be used to determine and adjust a physical layer setting in the wireless device. In an example method related to the example environment illustrated in FIG. 3A, the method may include a user operating a mobile device to make a phone call. Upon initiation of the call, a camera embedded in the mobile device may be activated. The activated camera may obtain image data representative of environment 310. The image data may be received from the sensor, and the received data may be processed to generate an environment parameter or parameters indicating, for example, that environment 310 may be an indoor enclosed environment. A propagation channel characteristic or characteristics such as, for example, any of those listed herein, may be determined based on the environment parameter or parameters. The propagation channel characteristic or characteristics may be used to adjust a physical layer setting in the wireless device. Thereby, advantageous transmission techniques may be used in the wireless device based on the environment around the device.

Figure 4A:
FIGS. 4A and 4B are illustrations of an example environment and example object recognition and expected propagation paths in the environment.
Figure 4B:
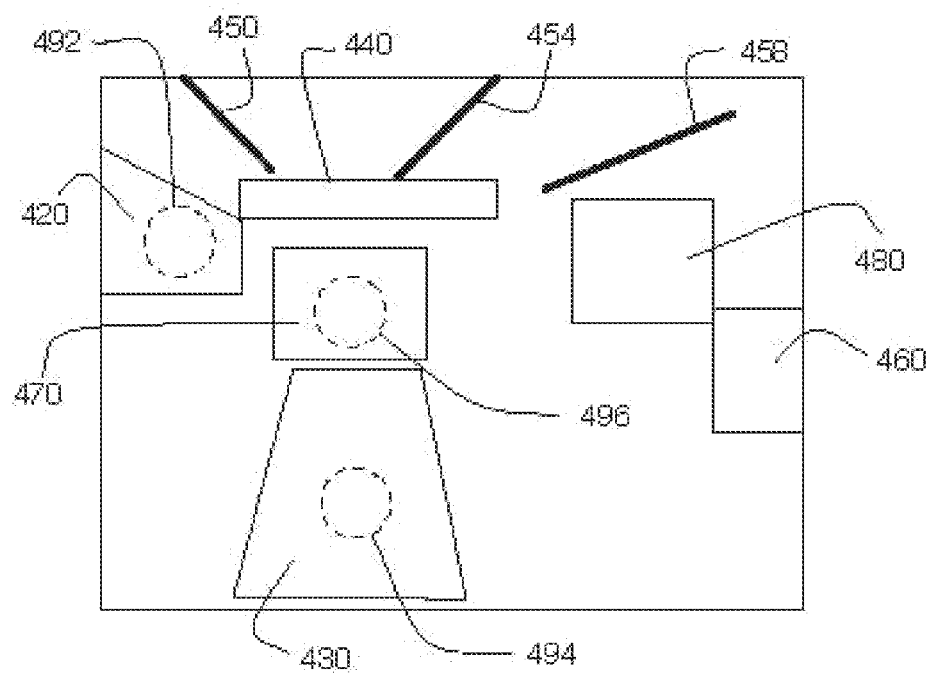

FIGS. 4A and 4B are illustrations of an example environment and example object recognition in the environment. FIG. 4A illustrates an example environment 410. As discussed above, a camera in a wireless device may obtain image data representative of environment 410 during an activation event at the wireless device. The image of FIG. 4A is meant to be illustrative, in the discussed examples, the obtained image data may not be displayed in visual form to a user. The image data may be processed to evaluate or identify objects in environment 410. For example, the image data may be processed using edge detection techniques, edge orientation determination techniques, surface detection techniques, surface roughness detection techniques, color evaluation techniques, color contrast detection techniques, object detection, modeling techniques or any of the techniques discussed herein.

FIG. 4B is an illustration of example of object recognition based on environment 410. As shown in FIG. 4B, surfaces 420, 430, 440, clutter 470, edges 450, 454, 458, tree 480, and face 460 may be recognized based on processing the image data related to environment 410. The image illustrated in FIG. 4B may be represented as a data set or a data file, for example. The objects and information based on the processing may be used to determine an environment parameter related to environment 410, as discussed above with respect to FIG. 1. In some examples, environment 410 may be determined to be an indoor corridor environment and the environment parameter may include an indoor corridor indication. In some examples, the environment parameter may include an indication of the amount or density of objects in the indoor corridor environment. In some examples, a detailed mapping of the indoor corridor environment including object locations, or the like.

As discussed, the processed data may be used to determine propagation channel characteristics. In the example of FIGS. 4A and 4B, the processed image data may be used to determine propagation channel characteristics. In some examples, the recognized objects, and their related details (i.e., sizes, orientations, locations, and the like) may be used to determine propagation channel characteristics. In various examples, the propagation channel characteristics may include, for example, a Doppler frequency spectrum of the propagation channel, a temporal auto-correlation of the propagation channel, a shadowing of the propagation channel, a multi-path propagation phenomenon of the propagation channel, a reflection of the propagation channel, a refraction of the propagation channel, a diffraction of the propagation channel, a diffuse scattering of the propagation channel, a frame length, a symbol length, a multipath severity of the propagation channel, or the like.

In some examples, the propagation channel characteristics may include a channel profile. For example, in the illustration of FIG. 4B, typical channel path distributions may be expected at, for example, a location 492 at surface 420, a location 494 at surface 430, at a location 496 at surface 470, at locations around tree 480, and at locations between edges 450, 454, 458. The locations around tree 480 and between edges 450, 454, 458 are not shown for the sake of clarity of presentation. Thereby, predicted propagation arrival paths, both in the azimuth and the elevation, may be determined. In some examples, the detected edges, corners, surfaces of buildings, or detected objects may provide an approximation of a composition of the channel. In some examples, edges may be a source of electromagnetic wave radiation. In some examples, surfaces may influence the channel by adding spread in delay, angles and polarization. In some examples, objects in the environment may cause signal attenuation and fading in the signal power of a propagation channel. Such details may be determined from the environment parameter or parameters to characterize the propagation channel.

As discussed with respect to FIG. 1, the propagation channel characteristic may be used to determine and adjust a physical layer setting in the wireless device. In an example method related to the example environment illustrated in FIG. 4A, the method may include a user operating a mobile device to make a phone call. Upon initiation of the call, a camera embedded in the mobile device may be activated. The activated camera may obtain image data representative of environment 410. The image data may be received from the sensor, and the received data may be processed to generate an environment parameter or parameters indicating, for example, that environment 410 may be an indoor corridor environment. A propagation channel characteristic or characteristics such as, for example, any of those listed herein, may be determined based on the environment parameter or parameters. The propagation channel characteristic or characteristics may be used to adjust a physical layer setting in the wireless device. Thereby, advantageous transmission techniques may be used in the wireless device based on the environment around the device.

As discussed with respect to FIGS. 2 to 4, environmental details may be used to determine channel characteristics. In some examples, the objects in the environment provided via environment parameters may be linked to channel characteristics using ray tracing techniques. In some examples, the objects in the environment provided via environment parameters may be linked to channel characteristics using ray launching techniques. In some examples, the objects in the environment provided via environment parameters may be linked to channel characteristics using channel simulation techniques. In some examples, the moving status of objects along with the sizes of the objects may be used to reconstruct or approximate a Doppler frequency spectrum, which may be used to determine the time variability of the channel, fading statistics of the channel, or temporal auto-correlation of the channel. In some examples, buildings, trees, or large objects may be used to determine the status of shadowing in the propagation channel, which may be used to adjust a power allocation physical setting in the mobile device. In some examples, the details of the environment may be used to approximate a number of independent paths existing in a propagation channel and the multiple-input and multiple-output (MIMO) rank of the channel, which may be used to approximate the number of antennas required to transmit at a predefined data rate.

In some examples, the environment parameters or details may be used to determine a richness or quality of channel multipaths. In some examples, the quality may be quantified using an indicator such as a poor indicator, a moderate indicator or a good indicator. Depending on the quality indicator, a physical setting may be applied to the mobile device. For example, in a corridor environment path, the quality may be defined as poor when several propagation paths may be concentrated due to corridor walls and physical settings that require uncorrelation among antennas and beam forming techniques may be applied.

In some examples, the channel characteristics may include a deterministic part and a random part of the channel impulse responses, and the ratio of the two may be used to determine if the channel is in a line of sight scenario such that a channel K factor may be determined. The K factor may be used to predict a bit error rate in the channel, which may be used to determine a variety of physical layer settings for the wireless device.

As discussed, any of the environment parameters may be used in conjunction to determine propagation channel characteristics. Also as discussed, any of the channel characteristics may be used in conjunction to determine physical layer settings for the wireless device. In some examples, the determined channel characteristics may be used to select physical layer settings. In such examples, the characteristics may be balanced against each other to determine the applied physical layer settings.

As discussed, in some examples, an environment parameter or parameters may be determined based on image data received from a camera being processed. In some examples, the image data processing may be broken into stages. For example, a first stage of processing may include determining areas in the image with uniform color and sharp changes in color. Such processing may determine edge locations and orientations. Such processing may be used to determine the discussed environment parameters, channel characteristics, and physical layer settings. Such first stage processing may be sufficient for some applications or it may be used as a first pass to determine settings quickly. Changes may be made based on the first stage of processing and changed or refined later, for example. In some examples, a second stage of processing may include the determination of clutter objects in the environment. The discussed environment parameters, channel characteristics, and physical layer settings may be determined based on the second stage to refine the settings. In some examples, a third stage may include determining more detailed objects in the environment such as buildings, trees and humans. The discussed environment parameters, channel characteristics, and physical layer settings may be determined based on the third stage to refine the settings.

As discussed, in some examples, the environment parameter may include an indication describing a movement of the mobile device. In some examples, the movement may include the mobile device moving. In some examples, the movement may include the objects around the mobile device moving while the mobile device is relatively fixed. In some examples, both the mobile device and the surrounding objects may be moving. In general, the environment parameter may include an indication of an approximation of which situation the movement may relate to, such as, for example, a mobile device moving indicator, a fixed mobile device moving object indicator, or a moving mobile device and moving object indicator. As discussed, the environment parameter may be used to determine propagation channel characteristics. In examples, where the movement is described in the environment parameter, the determined channel characteristic may include channel fading rate. In some examples, a record of the motion of the objects and the mobile device based on a series of images obtained at a camera may be used to predict a trend in the channel fading characteristics.

As discussed, a sensor in a wireless device may be employed to obtain data for use in adjusting a physical layer setting in the wireless device. In some examples, the sensor may be a microphone and the obtained data may be audio data that may represent an audio recording. In some examples, the recorded audio may include the voice of the user, the resonance of the user's voice generated by reflections in the environment, or sounds directly from the environment. As discussed with respect to FIG. 1, the obtained data may be received and processed to determine an environment parameter. In some examples, the audio data processing may include resonance detection. In general, audio resonance detection may include analyzing audio data to determine a tendency of the audio data to oscillate at certain frequencies. In general, any of the environment parameters discussed herein may be determined using such techniques. In some examples, audio resonance detection at certain frequencies may be related to the mobile device being in an indoor environment.

In some examples, the audio data processing may include audio echo detection. In general, audio echo detection may include analyzing the audio data to determine certain frequencies may have been reflected back to the mobile device from an object or a surface, for example. In general, any of the environment parameters discussed herein may be determined using such techniques. In some examples, audio echo detection may be related to walls being near the mobile device and the determined environment parameter may include an indoor indication. In some examples, audio echo detection may be related to hard outdoor surfaces such as mountains or privacy fences and the determined environment parameter may include an outdoor indication. In some examples, the audio echo detection may include an evaluation of the intensity of the echo to determine the related environment parameter.

As discussed, in some examples the sensor may include a camera and the data processed to determine an environment parameter, a propagation channel characteristic and a physical layer setting for the wireless device may include image data or a series of image data. In some examples, the sensor may include a microphone and the data may include audio data. In some examples, both a camera and a microphone may be used together to determine an environment parameter, a propagation channel characteristic and a physical layer. Both image data and sound data may be received and processed to generate an environment parameter as discussed herein. A propagation channel characteristic may be determined based on the environment parameter and a physical layer setting in a wireless device may be adjusted based on the propagation channel characteristic. In some example, the camera and microphone may be used contemporaneously. In other examples, the camera may be used to obtain image data and microphone may be used to obtain audio data at different, but similar, times such that the data may be representative of a same or similar environment around the wireless device.

As discussed, in some examples, out-band information may be used to adapt communication settings in wireless devices. In some examples, the out-band information, such as, for example, information discussed with respect to FIG. 1 herein, may be used with in-band information and corresponding techniques to adapt communications settings. In some examples, in-band techniques may include in-band channel sensing and channel estimation, determining composite channel coefficients, determining channel status information, determining delay taps, determining frequency response, determining optimum direction of departure, determining optimum direction of arrival, or the like. In some examples, one or more of those techniques may be used with the out-band techniques discussed herein to, for example, determine propagation channel characteristics or to determine and adjust physical layer settings in a wireless device. In some examples, in-band techniques may be implemented in the physical layer and the implementation of the in-band and out-band settings may be implemented in the physical layer of the wireless device.

As discussed, in some examples, sensor activation may occur at a wireless communication event or at regular time intervals. In general, sensor activation may occur at any time or event such that useful environment information may be obtained. In some examples, the activation may occur at start-up of the mobile device. In some examples, the activation may occur at the command of the user of the mobile device. In some examples, the activation may occur when the wireless device is handed off between cellular stations.

As discussed, sensors in wireless devices may be processed to generate parameters that may represent an environment around the mobile device. The environment parameters may be used to determine propagation channel characteristics. In some examples, the characteristics may be used to adjust physical layer settings in the mobile device. In other examples, the characteristics may be used to adjust physical layer settings at a base station related to the mobile device. As discussed, the processing of the data obtained at the sensor in the wireless device may be processed at the wireless device or at a remote server or computer. In some examples, the data or portions of the data obtained at the sensor may be transmitted to a remote server or computer. The remote server or computer may process the received data to determine parameters that may represent an environment around the mobile device and determine propagation channel characteristics using any of the techniques discussed herein. In some examples, based on the channel characteristics, the server or computer may determine physical layer settings for a base station. Those settings may be transmitted to the base station for implementation. In other examples, the server or computer may determine physical layer settings for the mobile device. Those settings may be transmitted to the wireless device for implementation.

FIG. 5 illustrates an example computer program product 500 arranged in accordance with at least some embodiments of the present disclosure. Computer program product 500 may include a signal bearing medium 502. Signal bearing medium 502 may include one or more machine-readable instructions 504, which, when executed by one or more processors, may operatively enable a computing device to provide the functionality described herein. In various examples, some or all of the machine-readable instructions may be used by the devices discussed herein.

In some implementations, signal bearing medium 502 may encompass a computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) COs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). In some examples, signal bearing medium 502 may encompass a machine readable non-transitory medium.

Figure 6:
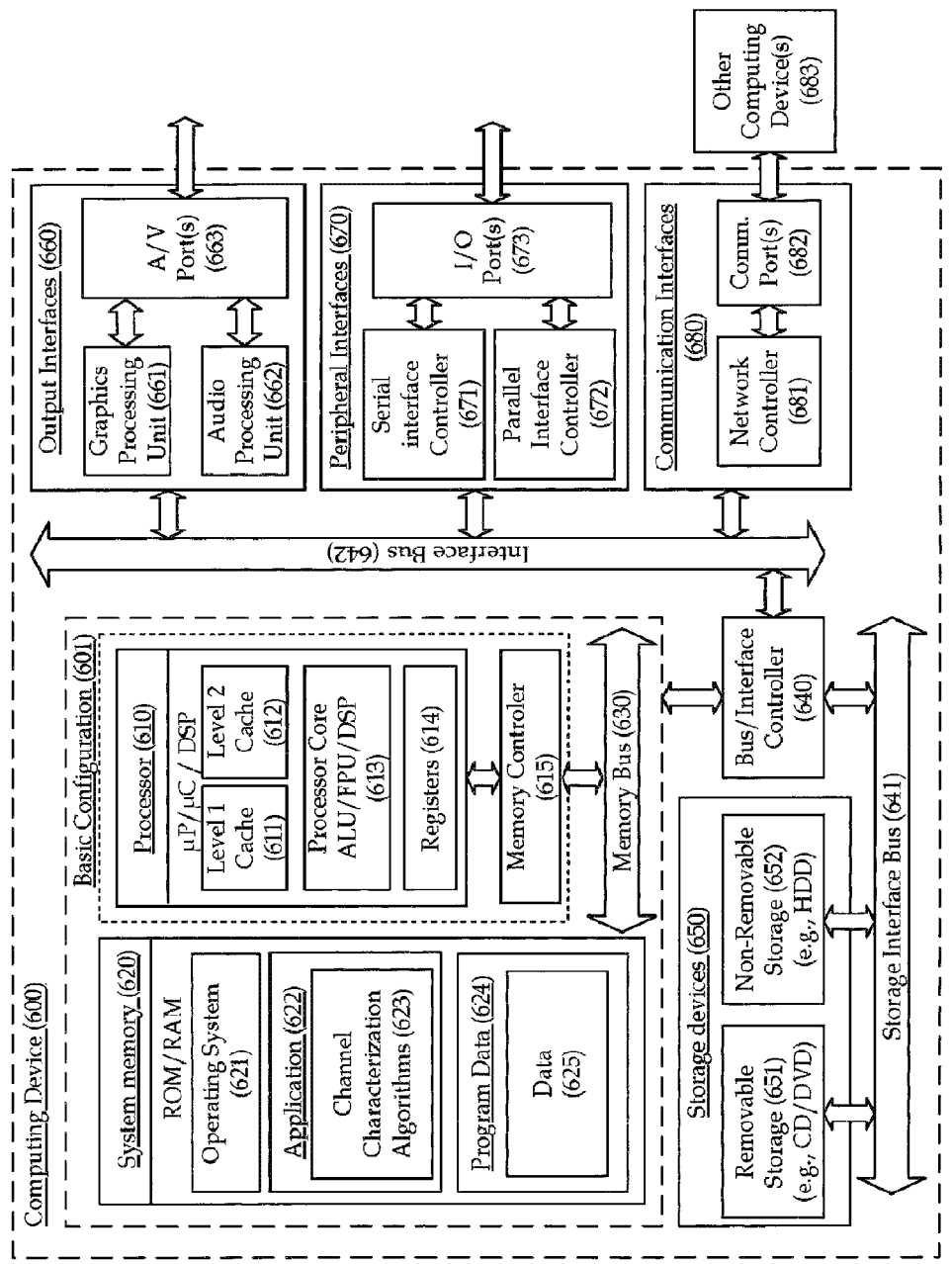
FIG. 6 is a block diagram illustrating an example computing device; all arranged in accordance with at least some embodiments of the present disclosure.
Figure 6:
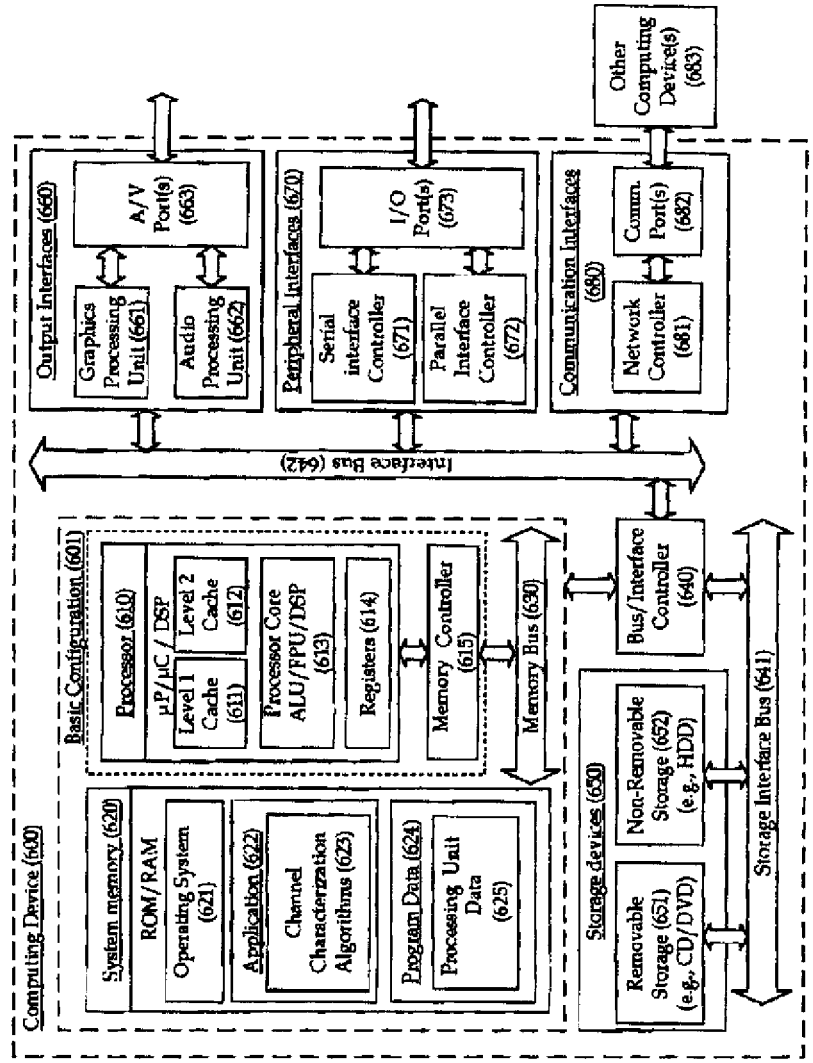

FIG. 6 is a block diagram illustrating an example computing device 600 arranged in accordance with at least some embodiments of the present disclosure. In various examples, computing device 600 may be configured to provide the operations discussed herein. In an example, the devices discussed with respect to FIG. 6 may be provided as a part of computing device 600. In one example basic configuration 601, computing device 600 may include one or more processors 610 and system memory 620. A memory bus 630 can be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 can include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include channel characterization application 623 that can be arranged to perform the functions, actions, and/or operations as described herein including the functional blocks, actions, and/or operations described herein. Program Data 624 may include process unit data 625 for use with process unit control application 623. In some example embodiments, application 622 may be arranged to operate with program data 624 on an operating system 621. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more NV ports 663. Example peripheral interfaces 670 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 683 over a network communication via one or more communication ports 682. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A method for using out-band information to adapt communication settings in a wireless device, the method comprising:
   receiving image data from a camera included in the wireless device;
   processing the received data, at the wireless device, to generate an environment parameter related to an environment around the wireless device,
   wherein the environment parameter includes a categorization and a sub-categorization within the categorization of the environment around the wireless device;
   determining a propagation channel characteristic based on the environment parameter; and
   responsive to the determined propagation channel characteristic, adjusting a physical layer setting in the wireless device, wherein the physical layer setting is based at least in part on the propagation channel characteristic.

2. The method of claim 1,
   wherein the processing the received data comprises:
      processing the image data by at least one of detecting an edge,
      determining an edge orientation and a length of the edge,
      detecting a surface, determining areas of uniform color,
      determining sharp changes in color,
      detecting a human face,
      detecting a traffic lane,
      detecting an object,
      recognizing a shape, or
      modeling an object.

3. The method of claim 1, wherein the image data includes a series of image data, and wherein the processing the received data includes determining an object motion in the series of image data.

4. The method of claim 1, further comprising: receiving audio data from a microphone included in the wireless device, and
   wherein the processing the received data comprises processing the audio data by at least one of resonance detection or audio echo detection.

5. The method of claim 1, wherein the environment parameter comprises at least one of an indoor indication, an outdoor indication, an urban indication, a suburban indication, a rural indication, a corridor indication, a cafeteria indication, a confined room indication, a stationary indication, a vehicular motion indication, a nomadic indication, a plant-rich indication, an open area indication, or a closed area indication.

6. The method of claim 1, wherein the propagation channel characteristic further comprises at least one of a time-variability of the propagation channel, a Doppler frequency spectrum of the propagation channel, a temporal autocorrelation of the propagation channel, a shadowing of the propagation channel, a multi-path propagation phenomenon of the propagation channel, a reflection of the propagation channel, a refraction of the propagation channel, a diffraction of the propagation channel, a diffuse scattering of the propagation channel, a selectivity of the propagation channel in angles, a polarization status of the propagation channel, a frame length, a symbol length, or a multipath severity of the propagation channel.

7. The method of claim 1, wherein the physical layer setting comprises at least one of a diversity scheme selection parameter, a signal-to-noise ratio prediction parameter, an adaptive modulation parameter, a data rate adaption parameter, a beam forming parameter, a Doppler frequency setting, a polarization setting, or a channel status information feedback scheme parameter.

8. The method of claim 1, wherein the propagation channel characteristic further comprises at least one predicted azimuthal propagation arrival path for the wireless device, at least one predicted horizontal propagation arrival path for the wireless device, or a number of independent paths existing in a propagation channel for the wireless device.

9. A method for using out-band information to adapt communication settings in a wireless device, the method comprising:
   receiving image data from a camera included in the wireless device;
   receiving sound data from a microphone included in the wireless device;
   processing the received image data and the received sound data, at the wireless device, to generate an environment parameter related an environment around the wireless device,
   wherein the environment parameter includes a categorization and a sub-categorization within the categorization of the environment around the wireless device;
   determining a trend in a channel fading characteristic based at least in part on a relative motion between the wireless device and one or more surrounding objects;
   determining a propagation channel characteristic based on the environment parameter; and
   responsive to the determined propagation channel characteristic, adjusting a physical layer setting in the wireless device, based at least in part on the propagation channel characteristic.

10. The method of claim 9, wherein the propagation channel characteristic further comprises at least one of a time-variability of the propagation channel, a Doppler frequency spectrum of the propagation channel, a temporal auto-correlation of the propagation channel, a spatial autocorrelation of the propagation channel, a frequency auto-correlation of the propagation channel, a shadowing of the propagation channel, a multi-path propagation phenomenon of the propagation channel, a reflection of the propagation channel, a refraction of the propagation channel, a diffraction of the propagation channel, a diffuse scattering of the propagation channel, a selectivity of the propagation channel in angles, a polarization status of the propagation channel, a frame length, a symbol length, or a multipath severity of the propagation channel.

11. The method of claim 9, wherein the physical layer setting comprises at least one of a diversity scheme selection parameter, a signal-to-noise ratio prediction parameter, an adaptive modulation parameter, a data rate adaption parameter, an optimum direction of arrival parameter, an optimum direction of departure parameter, a beam forming parameter, a Doppler frequency setting, a polarization setting, or a channel status information feedback scheme parameter.

12. A machine readable non-transitory medium having stored therein a plurality of instructions that, when executed, cause the machine to provide communication settings for a wireless device based on out-band information by:
receiving image data from a camera included in the wireless device;
processing the received data to generate an environment parameter related to an environment around the wireless device,
wherein the environment parameter includes a categorization and a sub-categorization within the categorization of the environment around the wireless device;
determining a propagation channel characteristic based on the environment parameter, the propagation channel characteristic including at least a channel fading rate; and
responsive to the propagation channel characteristic, generating a physical layer setting for the wireless device, based at least in part on the propagation channel characteristic.

13. The machine readable non-transitory medium of claim 12, wherein the processing the received data comprises:
processing the image data by at least one of detecting an edge,
determining an edge orientation and a length of the edge,
detecting a surface,
determining areas of uniform color,
determining sharp changes in color,
detecting a human face,
detecting a traffic lane,
detecting an object,
recognizing a shape, or
modeling an object.

14. The machine readable non-transitory medium of claim 12, further having stored therein a plurality of instructions that, when executed, cause the machine to provide communication settings for a wireless device based on out-band information by:
receiving audio data from a microphone included in the wireless device, and wherein the processing the received data comprises processing the audio data by at least one of resonance detection or audio echo detection in the audio track.

15. The machine readable non-transitory medium of claim 12, wherein the propagation channel characteristic further comprises at least one of a time-variability of the propagation channel, a Doppler frequency spectrum of the propagation channel, a temporal auto-correlation of the propagation channel, a spatial auto-correlation of the propagation channel, a frequency auto-correlation of the propagation channel, a shadowing of the propagation channel, a multipath propagation phenomenon of the propagation channel, a reflection of the propagation channel, a refraction of the propagation channel, a diffraction of the propagation channel, a diffuse scattering of the propagation channel, a selectivity of the propagation channel in angles, a polarization status of the propagation channel, a frame length, a symbol length, or a multipath severity of the propagation channel.

16. The machine readable non-transitory medium of claim 12, wherein the physical layer setting comprises at least one of a diversity scheme selection parameter, a signal-to-noise ratio prediction parameter, an adaptive modulation parameter, a data rate adaption parameter, a beam forming parameter, a Doppler frequency setting, a polarization setting, or a channel status information feedback scheme parameter.

17. The machine readable non-transitory medium of claim 12, wherein the propagation channel characteristic further comprises at least one predicted azimuthal propagation arrival path for the wireless device, at least one predicted horizontal propagation arrival path for the wireless device, or a number of independent paths existing in a propagation channel for the wireless device.

18. An apparatus comprising:
a machine readable non-transitory medium having stored therein a plurality of instructions that, when executed, cause the apparatus to provide communication settings for a wireless device based on out-band information by:
receiving image data from a camera included in the wireless device;
processing the received data to generate an environment parameter related to an environment around the wireless device,
wherein the environment parameter includes a categorization and a sub-categorization within the categorization of the environment around the wireless device;
maintaining a record of a relative motion between the wireless device and one or more surrounding objects;
determining a trend in a channel fading characteristic based at least in part on the record;
determining a propagation channel characteristic based on the environment parameter; and
responsive to the determined propagation channel characteristic, generating a physical layer setting for the wireless device, the physical layer setting for the wireless device being based at least in part on the propagation channel characteristic; and
a processor coupled to the machine readable non-transitory medium to execute the plurality of instructions.

19. The apparatus of claim 18, wherein the processing the received data comprises:
processing the image data by at least one of detecting an edge,
determining an edge orientation and a length of the edge,
detecting a surface,
determining roughness of a surface,
determining areas of uniform color,
determining sharp changes in color,
detecting a human face,
detecting a traffic lane,
detecting an object,
recognizing a shape, or
modeling an object.

20. The apparatus of claim 18, wherein the machine readable non-transitory medium further having stored therein a plurality of instructions that, when executed, cause the apparatus to provide communication settings for a wireless device based on out-band information by:
  receiving audio data from a microphone included in the wireless device, and
  wherein the processing the received data comprises processing the audio data by at least one of resonance detection or audio echo detection in the audio track.

21. The apparatus of claim 18, wherein the propagation channel characteristic further comprises at least one of a time-variability of the propagation channel, a Doppler frequency spectrum of the propagation channel, a temporal auto-correlation of the propagation channel, a spatial autocorrelation of the propagation channel, a frequency auto-correlation of the propagation channel, a shadowing of the propagation channel, a multi-path propagation phenomenon of the propagation channel, a reflection of the propagation channel, a refraction of the propagation channel, a diffraction of the propagation channel, a diffuse scattering of the propagation channel, a selectivity of the propagation channel in angles, a polarization status of the propagation channel, a frame length, a symbol length, or a multipath severity of the propagation channel.

22. The apparatus of claim 18, wherein the physical layer setting comprises at least one of a diversity scheme selection parameter, a signal-to-noise ratio prediction parameter, an adaptive modulation parameter, a data rate adaption parameter, a beam forming parameter, a Doppler frequency setting, a polarization setting, or a channel status information feedback scheme parameter.

* * * * *

UNITED STATES PATENT AND TRADEMARK OFFICE
CERTIFICATE OF CORRECTION

PATENT NO.         : 8,903,325 B2
APPLICATION NO.    : 13/634199
DATED              : December 2, 2014
INVENTOR(S)        : Yin It is certified that error appears in the above-identified patent and that said Letters Patent is hereby corrected as shown below:

On the Title Page, item (56), under "OTHER PUBLICATIONS", in Column 2, Line 1, delete "et al," and insert -- et al., --, therefor.

On Page 2, item (56), under "OTHER PUBLICATIONS", in Column 1, Line 1, delete "et al," and insert -- et al., --, therefor.

On Page 2, item (56), under "OTHER PUBLICATIONS", in Column 2, Line 1, delete "et al," and insert -- et al., --, therefor.

On Page 2, item (56), under "OTHER PUBLICATIONS", in Column 2, Line 4, delete "et al," and insert -- et al., --, therefor.

In the Drawings

In Fig. 6, Sheet 6 of 6, in Box "(615)", in Line 1, delete "Controler" and insert -- Controller --, therefor. (See attached Sheet)

In Fig. 6, Sheet 6 of 6, in Box "(625)", in Line 1, delete "Data" and insert -- Processing Unit Data --, therefor. (See attached Sheet)

In the Specification

In Column 1, below Title, insert -- CROSS-REFERENCE TO RELATED APPLICATION
The present application is a U.S. national stage filing under 35 U.S.C. §371 of International Application No. PCT/CN2011/071124, filed on Feb. 21, 2011. --.

In Column 5, Line 30, delete "As is" and insert -- as is --, therefor.

Signed and Sealed this
Sixteenth Day of June, 2015

Michelle K. Lee
*Director of the United States Patent and Trademark Office*

CERTIFICATE OF CORRECTION (continued)
U.S. Pat. No. 8,903,325 B2

In Column 13, Line 23, delete "COs," and insert -- CDs, --, therefor.

In Column 14, Line 40, delete "NV ports" and insert -- A/V ports --, therefor.

In Column 15, Line 60, delete "and or" and insert -- and/or --, therefor.

In the Claims

In Column 18, Line 54, in Claim 9, delete "related" and insert -- related to --, therefor.

In Column 20, Lines 45-46, in Claim 18, delete "on the" and insert -- on --, therefor.